United States Patent

Yoshimura et al.

[11] 4,339,553
[45] Jul. 13, 1982

[54] WATER-BASED FLUOROELASTOMER COATING COMPOSITION

[75] Inventors: Tastushiro Yoshimura; Tsutomu Terada, both of Takatsuki, Japan

[73] Assignee: Daikin Kogyo Co., Ltd., Osaka, Japan

[21] Appl. No.: 177,941

[22] Filed: Aug. 14, 1980

[30] Foreign Application Priority Data

Aug. 14, 1979 [JP] Japan .............................. 54-103813
Sep. 25, 1979 [JP] Japan .............................. 54-123621

[51] Int. Cl.³ .............................. C08L 27/16
[52] U.S. Cl. .............................. 524/544; 524/546
[58] Field of Search .............................. 260/29.6 F, 29.2 M

[56] References Cited

U.S. PATENT DOCUMENTS 3,929,721 12/1975 Leverett .............................. 260/42.15
4,065,417 12/1977 Wong et al. .............................. 260/29.6 F

OTHER PUBLICATIONS

DuPont's "Viton", Bulletin, No. 5, Apr. 1961.

Primary Examiner—John Kight, III
Assistant Examiner—Amelia B. Yarbrough
Attorney, Agent, or Firm—Birch, Stewart, Kolasch and Birch

[57] ABSTRACT

A water-based fluoroelastomer coating composition improved in adhesiveness onto a substrate, which comprises (A) an aqueous fluoroelastomer dispersion blended with (B) an aminosilane compound of the formula:

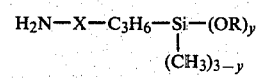

wherein R is methyl or ethyl, X is a single bond,

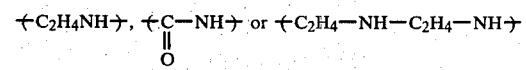

and y is an integer of 2 or 3 and optionally with (C) an amine compound having at least one terminal amino group directly bonded to an aliphatic hydrocarbon residue.

5 Claims, No Drawings

WATER-BASED FLUOROELASTOMER COATING COMPOSITION

The present invention relates to a water-based fluoroelastomer coating composition. More particularly, it relates to a water-based fluoroelastomer coating composition improved in adhesiveness onto a substrate.

Fluoroelastomers have excellent heat, weather, oil, solvent and chemical resistances so that various substrates such as fabrics, fibers, metals, plastics, etc. are coated or impregnated with compositions comprising the fluoroelastomers.

There is known a solvent type fluoroelastomer coating composition which comprises a fluoroelastomer and an organic solvent blended with an aminosilane compound as a vulcanizing agent to improve its adhesiveness onto a substrate (cf. Japanese Patent Publication (examined) No. 18346/1972). Although this coating composition assures a good adhesion onto the surface of a substrate, the essential use of an organic solvent is not favorable from the viewpoint of economy and safety. There is also known a water-based fluoroelastomer coating composition comprising an aqueous fluoroelastomer dispersion blended with a polyamine compound (e.g. hexamethylenediamine carbamate, N,N-dicynnamylidene-1,6-hexanediamine) as a vulcanizing agent (cf. DuPont's "Viton", Bulletin, No. 5, April, 1961). Since, however, the coating composition of this type does not have a satisfactory adhesiveness, the roughening (e.g. blasting) of the surface of a substrate and/or the use of any appropriate adhesive agent are required.

As the result of an extensive study, it has now been found that the incorporation of a certain specific aminosilane compound into a water-based fluoroelastomer coating composition improves remarkably the adhesiveness onto a substrate so that the roughening procedure and the use of any adhesive agent can be omitted. When the aminosilane compound is incorporated together with a certain specific amine compound, enhancement of the physical properties, particularly tensile strength, of a coating film resulting from the coating composition is produced in addition to improvement of the adhesiveness onto a substrate. In addition, it is advantageous that the pot life of the said coating composition is much longer than that of a solvent type fluoroelastomer coating composition. It is also advantageous that on spray-coating, the said coating composition does not produce any cobwebbing even when it contains the fluoroelastomer at a high concentration.

Accordingly, a main object of the present invention is to provide a water-based fluoroelastomer coating composition improved in adhesiveness onto a substrate with or without enhancement of the tensile strength of a coating film resulting therefrom.

The water-based fluoroelastomer coating composition of this invention comprises (A) an aqueous fluoroelastomer dispersion blended with (B) an aminosilane compound of the formula:

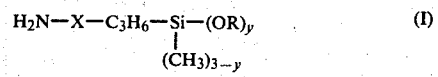

wherein R is methyl or ethyl, X is a single bond,

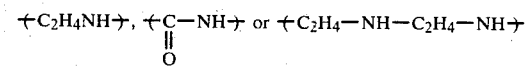

and y is an integer of 2 or 3 and optionally with (C) an amine compound having at least one terminal amino group directly bonded to an aliphatic hydrocarbon residue.

The fluoroelastomer used in the invention is a highly fluorinated elastic copolymer, preferably an elastic copolymer comprising units of vinylidene fluoride with units of at least one of other fluorine-containing ethylenically unsaturated monomers and having, for instance, a vinylidene fluoride unit content of not less than 40 mol%. A typical example of such favorable elastic copolymers is an iodine-containing fluoroelastomer, which comprises a polymeric chain essentially consisting of units of vinylidene fluoride and of at least one of other fluoroolefins copolymerizable therewith and an iodine atom(s) bonded at the terminal position(s) of the polymeric chain in an amount of 0.001 to 10% by weight, preferably of 0.01 to 5% by weight on the basis of the weight of the elastomer (cf. Japanese Patent Publication (unexamined) No. 40543/1977). Examples of the other fluorine-containing ethylenically unsaturated monomers are hexafluoropropene, pentafluoropropene, trifluoroethylene, trifluorochloroethylene, tetrafluoroethylene, vinyl fluoride, perfluoro(methyl vinyl ether), perfluoro(ethyl vinyl ether), perfluoro(propyl vinyl ether), etc. Among various fluoroelastomers, preferred are vinylidene fluoride/hexafluoropropene copolymer and vinylidene fluoride/tetrafluoroethylene/hexafluoropropene terpolymer.

As the aqueous fluoroelastomer dispersion, there may be used a fluoroelastomer emulsion obtained by emulsion polymerization of the said monomers. There may be also used an aqueous dispersion of the fluoroelastomer obtained by emulsion, suspension or bulk polymerization of the said monomers, collecting the produced fluoroelastomer from the reaction mixture, pulverizing the collected fluoroelastomer and redispersing the pulverized fluoroelastomer into water, if necessary, by the aid of a surfactant. The fluoroelastomer content in the aqueous dispersion may be from 10 to 70% by weight, preferably from 30 to 60% by weight. Such fluoroelastomer content can be readily attained by concentration or dilution. When desired, the aqueous fluoroelastomer dispersion may comprise any conventional additive such as a pigment, an acid acceptor or a filler in addition to the fluoroelastomer.

The aminosilane compound (I) acts as a vulcanizing agent and contributes in improvement of the adhesiveness of the coating composition. In this connection, it may be noted that for improvement of the adhesiveness of a solvent type fluoroelastomer coating composition, numerous and various kinds of aminosilane compounds are usable, but for improvement of the adhesiveness of a water-based fluoroelastomer coating composition as used in this invention, only the aminosilane compound representable by the formula (I) is usable, because the aminosilane compound (I) does not cause gellation, while the other aminosilane compounds do. Examples of the aminosilane compound (I) are as follows: γ-aminopropyltrimethoxysilane, γ-aminopropyltriethoxysilane, γ-(β-aminoethyl)aminopropyltrimethoxysilane, γ-(β-aminoethyl)aminopropyltriethoxysilane, γ-(β-aminoethyl)aminopropylmethyldimethoxysilane, γ- ureidopropyltriethoxysilane, γ-(β-(β-aminoethyl)aminoethyl)aminopropyltrimethoxysilane, etc. These aminosilane compounds may be used as such but their use in a partially or wholly hydrolyzed form is favored in assuring a highly improved effect without gelation. Hydrolysis may be effected, for instance, by treatment of the aminosilane compound with water to convert at least a part of the alkoxy group(s) represented by —OR into —OH.

The amine compound usable as the optional component serves as a vulcanizing agent. Their typical examples are monoamines (e.g. ethylamine, propylamine, butylamine, benzylamine, allylamine, n-amylamine, ethanolamine), diamines (e.g. ethylenediamine, trimethylenediamine, tetramethylenediamine, hexamethylenediamine, 3,9-bis(3-aminopropyl)-2,4,8,10-tetraoxaspiro[5.5]undecane, polyamines (e.g. diethylenetriamine, triethylenetetramine, pentaethylenehexamine). Among them, the ones having at least two terminal amino groups are preferred, and 3,9-bis(3-aminopropyl)-2,4,8,10-tetraoxaspiro[5.5]undecane is the most preferred.

The water-based fluoroelastomer coating composition of the invention may be prepared by adding the aminosilane compound (I) and optionally the amine compound to an aqueous fluoroelastomer dispersion, followed by thorough agitation to make a uniform mixture. When used, a conventional additive(s) such as a pigment, an acid acceptor and a filler may be incorporated therein before, during and/or after the addition of the aminosilane compound (I) and/or the amine compound. As stated hereinbefore, the use of the aminosilane compound (I) as previously hydrolyzed is favorable in prevention of the resulting coating composition from gellation.

When the aminosilane compound (I) is used alone, i.e. without the amine compound, its amount to be added may be from 1 to 30 parts by weight, preferably from 2 to 20 parts by weight, to 100 parts by weight of the fluoroelastomer. When the amine compound is employed, the combined amount of the aminosilane compound (I) and the amine compound is usually from 0.5 to 30 parts by weight, preferably from 1 to 20 parts by weight, to 100 parts by weight of the fluoroelastomer, the molar proportion of the aminosilane compound (I) and the amine compound being from 1:99 to 80:20.

The acid acceptor may be a conventional one, of which specific examples are oxides and hydroxides of divalent metals (e.g. magnesium, calcium, zinc, lead). Examples of the filler are silica, clay, talc, diatomaceous earth, carbon, etc.

The water-based fluoroelastomer coating composition of the invention may be coated on or impregnated into a substrate by a per se conventional procedure (e.g. brush-coating, dip-coating, spray-coating) and cured at temperature ranging from room temperature (e.g. 15° C.) to 200° C. for a sufficient period of time to form a film having an excellent adhesiveness onto a substrate and a greatly improved tensile strength.

As stated above, the water-based fluoroelastomer coating composition of the invention is greatly improved in its adhesiveness and tensile strength in comparison with a conventional water-based fluoroelastomer coating composition. It has a longer pot life (e.g. a period of 2 weeks to 1 month at 25° C.) than a solvent type fluoroelastomer coating composition (e.g. about 10 hours at 25° C.) and never causes cobwebbing even at high fluoroelastomer concentrations (e.g. 60% by weight) so that it is very easily handled while using and can afford a coating film of large thickness. Since no organic solvent is contained therein, it is non-flammable and hardly causes any pollution of the environment.

The water-based fluoroelastomer coating composition of the invention may be used as a corrosion preventing coating composition or a protecting coating composition in various industrial fields and also used as a sealing material or an adhesive agent. Further, it can be used as an electroconductive coating composition.

The present invention will be hereinafter explained in detail by the following Examples, in which part(s) and % are by weight unless otherwise indicated.

EXAMPLES 1 TO 4 AND COMPARATIVE EXAMPLES 1 TO 3

(Scratch test)

Mixtures A and B having the following compositions were mixed together in a weight proportion of 100:5 and filtered through a 200 mesh wire net to obtain a water-based fluoroelastomer coating composition:

| Mixture A | | Parts |
|---|---|---|
| Aqueous fluoroelastomer dispersion (fluoroelastomer content, 60%; containing a non-ionic surfactant "Nissan Nonion HS 208" produced by Nippon Oil and Fats Co., Ltd.) | | 166 |
| Magnesium oxide | | 5 |
| Medium thermal carbon | | 30 |
| "Nissan Nonion HS 208" (a non-ionic surfactant produced by Nippon Oil and Fats Co., Ltd.) | | 2 |
| Water | | 50 |
| Mixture B | | Parts |
| Aminosilane compound | | 90 |
| | Weight ratio | |
| Magnesium oxide | 3 | |
| Medium thermal carbon | 20 | 10 |
| "Nissan Nonion HS 208" | 2 | |
| Water | 50 | |

An aluminum plate of 100 mm in length, 50 mm in width and 1 mm in thickness was degreased with acetone. Onto the thus degreased plate, the above prepared coating composition was spray-coated and dried at a temperature of 50° to 70° C. for 10 minutes. Spray-coating and drying were repeated two more times to make a film of from 100 to 150μ in thickness. Then, the film was cured at 150° C. for 1.5 hours. The cured film was subjected to scratch test according to JIS (Japanese Industrial Standard) K 6894 to examine the film characteristics. The results were evaluated by five ranks and are shown in Table 1. For comparison, the above operations were repeated but using an amine compound in place of the aminosilane compound. The results are also shown in Table 1.

TABLE 1

| Example[*3] | Aminosilane compound[*1] or amine compound | Evaluation in scratch test |
|---|---|---|
| 1 | A-1100 | 5 |
| 2 | A-1120 | 5 |
| 3 | A-1160 | 4–5 |
| 4[*2] | A-1100 | 5 |
| Comparative 1 | A-1125 | Coating impossible due to gelation |
| Comparative | N,N-Dicinnamylidene- | 1–2 |

TABLE 1-continued

| Example*[3] | Aminosilane compound*[1] or amine compound | Evaluation in scratch test |
|---|---|---|
| 2 | 1,6-hexanediamine | |
| Comparative 3 | 3,9-Bis(3-amino-propyl)-2,4,8,10-tetraoxaspirol[5.5]un-decane | 1 |

Notes:
*[1]A-1100: $NH_2CH_2CH_2CH_2Si(OCH_2CH_3)_3$; A-1120: $NH_2CH_2CH_2NHCH_2CH_2CH_2Si(OCH_3)_3$; A-1160: $NH_2CONHCH_2CH_2CH_2Si(OCH_2CH_3)_3$; A-1125: $CH_3COCH_2CH_2NHCH_2CH_2NH-CH_2CH_2CH_2Si(OCH_3)_3$ (aminosilane compound having no terminal amino group)
*[2]In Example 4, the aminosilane compound A-1100 was previously completely hydrolyzed by water to $NH_2CH_2CH_2CH_2Si(OH)_3$.
*[3]In Examples 1 to 3, the fluoroelastomer dispersion was gelatinited very slightly, but in Example 4, no gelation occurred.

EXAMPLES 5 TO 7 AND COMPARATIVE EXAMPLE 4

(Peel strength test)

In the same manner as in Example 1, a film was formed on a substrate. The film was cut into a strip of 10 mm in width to the extent that the substrate was slightly flawed and then subjected to 180 degree peel test, in which one end of the strip was pulled by the aid of an autograph "IS-500" manufactured by Shimadzu Corp. at 24° C. at a rate of 50.0±2.5 mm/min. The results are shown in Table 2. For comparison, the above operation was repeated but using an amine compound in place of the aminosilane compound. The results are also shown in Table 2.

TABLE 2

| Example *[1] | 5 | 6 | 7 | Comparative 4 |
|---|---|---|---|---|
| Aminosilane compound or amine compound | A-1100 | A-1100 | A-1100 | 3,9-Bis(3-aminopropyl)-2,4,8,10-tetraoxaspiro-[5.5]undecane |
| Substrate | Aluminum plate | Aluminum plate | Iron plate | Iron plate |
| Blast finishing*[2] | Not | Done | Done | Done |
| Peel strength (kg/cm) | 2.53 | 2.51 | 2.03 | 0.15 |

Notes:
*[1]In Examples 5 to 7, the film was not peeled off but broken, and therefore the peel strength was indicated by a value at break. In Comparative Example 4, separation between the substrate and the film was produced, and thus the peel strength was indicated by a value at separation.
*[2]Blast finishing was effected by blasting 80 mesh Tosa emery at a wind loading of 5 kg/cm².

EXAMPLE 8

(Film property test)

In the same manner as in Example 1 but varying the amount of the aminosilane compound A-1100, water-based fluoroelastomer coating compositions were prepared. Each coating composition was spray-coated by a spray gun onto a polytetrafluoroethylene-coated aluminum plate and dried. These operations were repeated two more times. Thereafter, curing was effected at 150° C. for 1.5 hours to form a film of about 100μ in thickness. The resulting film was peeled off from the plate and subjected to test for 100% modulus, tensile strength and elongation according to JIS K 6301. The results are shown in Table 3.

TABLE 3

| A-1100 (parts)*[1] | 100% Modulus (kg/cm²) | Tensile strength (kg/cm²) | Elongation (%) |
|---|---|---|---|
| 5 | 24 | 77 | 500 |
| 10 | 40 | 82 | 240 |
| 15 | 83 | 98 | 140 |
| 20 | 95 | 102 | 110 |

Note:
*[1]The amount of A-1100 is based on 100 parts of the fluoroelastomer.

EXAMPLE 9 AND COMPARATIVE EXAMPLE 5

(Pot life and spray coating tests)

Mixtures A and B having the following compositions were mixed together in a weight proportion of 100:5 as in Example 1 to give a water-based fluoroelastomer coating composition:

| Mixture A | Parts |
|---|---|
| Aqueous fluoroleastomer dispersion (fluoroelastomer content, 60%; containing a non-ionic surfactant "Nissan Nonion HS 208") | 166 |
| Magnesium oxide | 3 |
| Medium thermal carbon | 20 |
| "Nissan Nonoin HS 210" (a non-ionic surfactant produced by Nippon Oil and Fats Co., Ltd.) | 2 |
| Water | 50 |

| Mixture B | Parts |
|---|---|
| A-1100 | 90 |
| water | 10 |

For comparison, the following Mixtures A and B were mixed together in a weight proportion of 100:22.2 in the same manner as above to give a solvent type fluoroelastomer coating composition:

| Mixture A | Parts |
|---|---|
| Fluoroelastomer | 100 |
| Magnesium oxide | 3 |
| Medium thermal carbon | 20 |
| Methyl ethyl ketone | 225 |
| Methyl isobutyl ketone | 90 |

| Mixture B | Parts |
|---|---|
| A-1100 | 10.8 |
| Ethanol | 89.2 |

The fluoroelastomer coating composition was charged into a glass bottle with a lid and allowed to stand at 24° C. to test the pot life of the coating composition. In case of the water-based coating composition (Example 9), gelation of the solid components occurred after 30 days, and it was impossible to redisperse the gel. In case of the solvent type coating composition (Comparative Example 5), gradual increase of viscosity was observed after 4 hours, and the whole coating composition became gel after 8 hours.

The fluoroelastomer coating composition was spray-coated on an aluminum plate with a spray nozzle of 0.8 mm in diameter under a spray pressure of 3.0 kg/cm². In case of the solvent type coating composition (Comparative Example 5), cobwebbing occurred immediately after the start of spraying, but in case of the water-based coating composition (Example 9), spraying could be done without any trouble to form an even film.

EXAMPLES 10 TO 14 AND COMPARATIVE EXAMPLES 6 TO 19

(Film property test)

To Mixture A having the following composition, Mixtures B and/or C having the following compositions were added to make a homogeneous mixture containing the designed amount(s) of the aminosilane compound and/or the amine compound, which was then filtered through a 200 mesh wire net to obtain a water-based fluoroelastomer coating composition:

| Mixture A | Parts |
|---|---|
| Aqueous fluoroelastomer dispersion (fluoroelastomer content, 60%; containing a non-ionic surfactant "Nissan Nonion HS 208") | 166 |
| Magnesium oxide | 3 |
| Medium thermal carbon | 20 |
| "Nissan Nonion HS 208" | 2 |
| Water | 50 |

| Mixture B | Parts |
|---|---|
| Aminosilane compound | 50 |
| Water | 50 |

| Mixture C | Parts |
|---|---|
| Amine compound | 50 |
| Water | 50 |

The coating composition was spray-coated by a spray gun on a polytetrafluoroethylene-coated aluminum plate and dried. These operations were repeated two more times, followed by curing at 150° C. for 30 minutes to make a film of about 150μ in thickness. The film was peeled off from the plate and subjected to test for tensile strength according to JIS K 6301. The results are shown in Table 4.

In the same manner as above but using A-1125 (i.e. $CH_3COCH_2CH_2NHCH_2CH_2NHCH_2CH_2CH_2Si(OCH_3)_3$), which is an aminosilane compound having no terminal amino group, in place of A-1100, a coating composition was prepared. However, the whole of the coating was gelatinized and could not be used for coating.

TABLE 4

| Example | Aminosilane compound (mole)*1 | Amine compound (mole)*1 | Tensile strength (kg/cm²) |
|---|---|---|---|
| 10 | A-1100 (0.005) | 3,9-Bis(3-aminopropyl)-2,4,8,10-tetraoxaspiro[5.5]undecane (0.005) | 115 |
| 11 | A-1100 (0.005) | Ethylenediamine (0.005) | 68 |
| 12 | A-1100 (0.005) | Ethanolamine (0.005) | 59 |
| 13 | A-1100 (0.005) | Triethylenetetramine (0.005) | 92 |
| 14 | A-1100 (0.01) | — | 48 |
| Comparative 6 | — | 3,9-Bis(3-aminopropyl)-2,4,8,10-tetraoxaspiro[5.5]undecane (0.01) | 93 |
| Comparative 7 | — | Ethylenediamine (0.01) | 60 |
| Comparative 8 | — | Ethanolamine (0.01) | 46 |
| Comparative 9 | — | Tetraethylenetetramine (0.01) | 85 |
| Comparative 10 | — | Hexamethylenediamine carbamate (0.01) | 93 |
| Comparative 11 | — | N,N'-Dicinnamylidene-1,6-hexanediamine (0.01) | 47 |
| Comparative 12 | — | m-Phenylenediamine (0.01) | 30 |
| Comparative 13 | — | Benzidine (0.01) | 27 |
| Comparative 14 | — | p,p'-Diaminodiphenyl ether (0.01) | 29 |
| Comparative 15 | A-1100 (0.05) | Hexamethylenediamine (0.005) | 78 |
| Comparative 16 | A-1100 (0.05) | N,N'-Dicinnamylidene-1,6-hexanediamine (0.005) | Coating impossible due to gelation |
| Comparative 17 | A-1100 (0.05) | m-Phenylenediamine (0.005) | 46 |
| Comparative 18 | A-1100 (0.05) | Benzidine (0.005) | 47 |
| Comparative 19 | A-1100 (0.05) | p,p'-Diaminodiphenyl ether (0.005) | 48 |

Note:
*1 Mol on the basis of 100 grams of the fluoroelastomer.

EXAMPLES 15 TO 20 AND COMPARATIVE EXAMPLE 20

(Film property and peeling tests)

In the same manner as in Example 10 but varying the amounts of the aminosilane compound and the amine compound, fluoroelastomer coating compositions were prepared. The film prepared from the coating composition was subjected to test for tensile strength according to JIS K 6301. For comparison, a water-based fluoroelastomer coating composition prepared in the same manner as in Example 10 was spray-coated on an iron plate previously degreased with acetone and dried at a temperature of 50° to 70° C. for 10 minutes. These operations were repeated two more times to form a film of from 100 to 150μ in thickness, which was cured at 150° C. for 0.5 hour. The thus cured film was cut into a strip of 100 mm in width to the extent that the plate was slightly flawed and then subjected to 180 degree peel test, in which one end of the strip was pulled by the aid of an autograph "IS-500" manufactured by Shimadzu Corp. at 24° C. at a rate of 50.0±2.5 mm/min. The results are shown in Table 5.

TABLE 5

| Example | A-1100 (mol)*1 | 3,9-Bis(3-aminopropyl)-2,4,8,10-tetraoxaspiro[5.5]-undecane (mol)*1 | Tensile strength (kg/cm²) | Peel strength (kg/cm) |
|---|---|---|---|---|
| 15*2 | 0.008 | 0.002 | 98 | 1.10 (separated) |
| 16 | 0.006 | 0.004 | 117 | 0.50 (separated) |
| 17 | 0.005 | 0.005 | 115 | — |
| 18 | 0.004 | 0.006 | 115 | 0.39 (separated) |
| 19 | 0.002 | 0.008 | 115 | 0.32 |

TABLE 5-continued

| Example | A-1100 (mol)[1] | 3,9-Bis(3-amino-propyl)-2,4,8,10-tetraoxaspiro[5.5]-undecane (mol)[1] | Tensile strength (kg/cm$^2$) | Peel strength (kg/cm) |
| --- | --- | --- | --- | --- |
| 20[2] | 0.01 | 0 | 48 | (separated) 1.50 |
| Comparative 20 | 0 | 0.01 | 93 | (separated) 0.19 (separated) |

Notes:
[1] Mol on the basis of 100 grams of the fluoroelastomer.
[2] In Examples 15 and 20, the thickness of the film was about 350 μ.

EXAMPLE 21 AND COMPARATIVE EXAMPLE 21

(Pot life and spray coating tests)

In the same manner as in Example 10, Mixtures A, B and C having the following compositions were mixed together to make a water-based fluoroelastomer coating composition containing A-1100 and 3,9-bis(3-aminopropyl)-2,4,8,10-tetraoxaspiro[5.5]undecane respectively in amounts of 0.005 mol per 100 grams of the fluoroelastomer:

| Mixture A | Parts |
| --- | --- |
| Aqueous fluoroelastomer dispersion (fluoroelastomer content, 60%; containing a non-ionic surfactant "Nissan Nonion HS 208") | 166 |
| Magnesium oxide | 3 |
| Medium thermal carbon | 20 |
| "Nissan Nonion HS 210" | 2 |
| Water | 50 |

| Mixture B | Parts |
| --- | --- |
| A-1100 | 50 |
| Water | 50 |

| Mixture C | Parts |
| --- | --- |
| 3,6-Bis(3-aminopropyl)-2,4,8,10-tetraoxaspiro[5.5]undecane | 50 |
| Water | 50 |

For comparison, the following Mixtures A, B and C were mixed together to make a solvent type fluoroelastomer coating composition containing A-1100 and 3,6-bis(3-aminopropyl)-2,4,8,10-tetraoxaspiro[5.5]undecane respectively in amounts of 0.005 mol per 100 grams of the fluoroelastomer:

| Mixture A | Parts |
| --- | --- |
| Fluoroelastomer | 100 |
| Magnesium oxide | 3 |
| Medium thermal carbon | 20 |
| Methyl ethyl ketone | 225 |
| Methyl isobutyl ketone | 90 |

| Mixture B | Parts |
| --- | --- |
| A-1100 | 20 |
| n-Butanol | 80 |

| Mixture C | Parts |
| --- | --- |
| 3,6-Bis(3-aminopropyl)-2,4,8,10-tetraoxaspiro[5.5]undecane | 50 |
| n-Butanol | 80 |

The fluoroelastomer coating composition was charged into a volume glass bottle with a lid and allowed to stand at 24° C. to test the pot life of the coating composition. In case of the water-based coating composition (Example 21), gelation of the solid components occurred after 30 days, and it was impossible to redisperse the gel. In case of the solvent type coating composition (Comparative Example 21), gradual increase of viscosity was observed after about 4 hours, and the whole coating composition became gel after about 10 hours.

The fluoroelastomer coating composition was spray-coated on an aluminum plate with a spray nozzle of 0.8 mm in diameter under a spray pressure of 3.0 kg/cm$^2$. In case of the solvent type coating composition (Comparative Example 21), cobwebbing occurred immediately after the start of spraying, but in case of the water-based coating composition (Example 21), it could be sprayed without any trouble to form an even film.

What is claimed is:

1. A water-based fluoroelastomer coating composition comprising (A) an aqueous fluoroelastomer dispersion blended with (B) an aminosilane compound of the formula:

$$H_2N-X-C_3H_6-Si-(OR)_y \atop (CH_3)_{3-y}$$

wherein R is methyl or ethyl, X is a single bond,

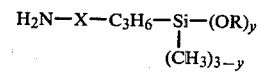

and y is an integer of 2 or 3 optionally with (C) an amine compound having at least one terminal amino group directly bonded to an aliphatic hydrocarbon residue.

2. The water-based fluoroelastomer coating composition according to claim 1, wherein the dispersion is blended with the aminosilane compound.

3. The water-based fluoroelastomer coating composition according to claim 1, wherein the dispersion is blended with the aminosilane compound and the amine compound.

4. The water-based fluoroelastomer coating composition according to any one of claims 1 to 3, wherein the aminosilane compound is the one partially or completely hydrolyzed.

5. The water-based fluoroelastomer coating composition according to claim 1 or 3, wherein the amine compound has at least two terminal amino groups directly bonded to an aliphatic hydrocarbon residue.

* * * * *

UNITED STATES PATENT AND TRADEMARK OFFICE
CERTIFICATE OF CORRECTION

PATENT NO. : 4,339,553

DATED : July 13, 1982

INVENTOR(S) : Yoshimura et al

It is certified that error appears in the above—identified patent and that said Letters Patent is hereby corrected as shown below:

On the title page,
In the category "[75] Inventors:" change "Tastushiro Yoshimura" to --Tatsushiro Yoshimura--

Signed and Sealed this

Eleventh Day of January 1983

[SEAL]

Attest:

GERALD J. MOSSINGHOFF

Attesting Officer

Commissioner of Patents and Trademarks